`US005794909A`

United States Patent [19]
Platus et al.

[11] Patent Number: 5,794,909
[45] Date of Patent: Aug. 18, 1998

[54] AUTO-ADJUST APPARATUS FOR A VIBRATION ISOLATION SYSTEM

[75] Inventors: David L. Platus, Los Angeles; Donald A. Durran, Manhattan Beach, both of Calif.

[73] Assignee: Minus K Technology, Inc., Inglewood, Calif.

[21] Appl. No.: 714,412

[22] Filed: Sep. 16, 1996

[51] Int. Cl.[6] ................................................. F16M 13/00
[52] U.S. Cl. ........................ 248/550; 248/620; 248/638
[58] Field of Search ................................ 248/550, 576, 248/620, 621, 619, 638

[56] References Cited

U.S. PATENT DOCUMENTS

| | | | |
|---|---|---|---|
| 4,643,385 | 2/1987 | Sandercock | 248/550 |
| 4,887,699 | 12/1989 | Ivers et al. | 248/699 X |
| 5,022,628 | 6/1991 | Johnson et al. | 248/550 X |
| 5,178,357 | 1/1993 | Platus | 248/619 |
| 5,310,157 | 5/1994 | Platus | 248/619 |
| 5,370,352 | 12/1994 | Platus | 248/619 |
| 5,390,892 | 2/1995 | Platus | 248/619 |
| 5,456,341 | 10/1995 | Garnjost et al. | 248/550 X |
| 5,549,270 | 8/1996 | Platus et al. | 248/619 |
| 5,626,332 | 5/1997 | Phillips et al. | 248/550 X |
| 5,645,260 | 7/1997 | Falangas | 248/550 |

*Primary Examiner*—Ramon O. Ramirez
*Attorney, Agent, or Firm*—Fulwider Patton Lee & Utecht, LLP

[57] ABSTRACT

An auto-adjust apparatus adjusts a vibration isolator to help accommodate varying weight loads and other effects which can cause the isolator to go out of adjustment, such as variations caused by changes in ambient temperature and creep of the isolator's main support spring. A small secondary spring is positioned in parallel with the main support spring of the isolator and is precompressed such that its compression increases the load on the main support spring by a small amount. An increase in the compression of this secondary spring will cause an increase in the load on the main support spring. Similarly, a decrease in the compression on this secondary spring will cause a decrease in the load on the main support spring. Sensors for sensing a deviation in the equilibrium position of the object relative to the base from its optimum equilibrium position are provided and generate an electrical signal indicating such deviations. A control system for correcting the deviation of the equilibrium position of the object from the optimum equilibrium position adjusts the compression on the secondary spring as may be required.

21 Claims, 3 Drawing Sheets

FIG. 3
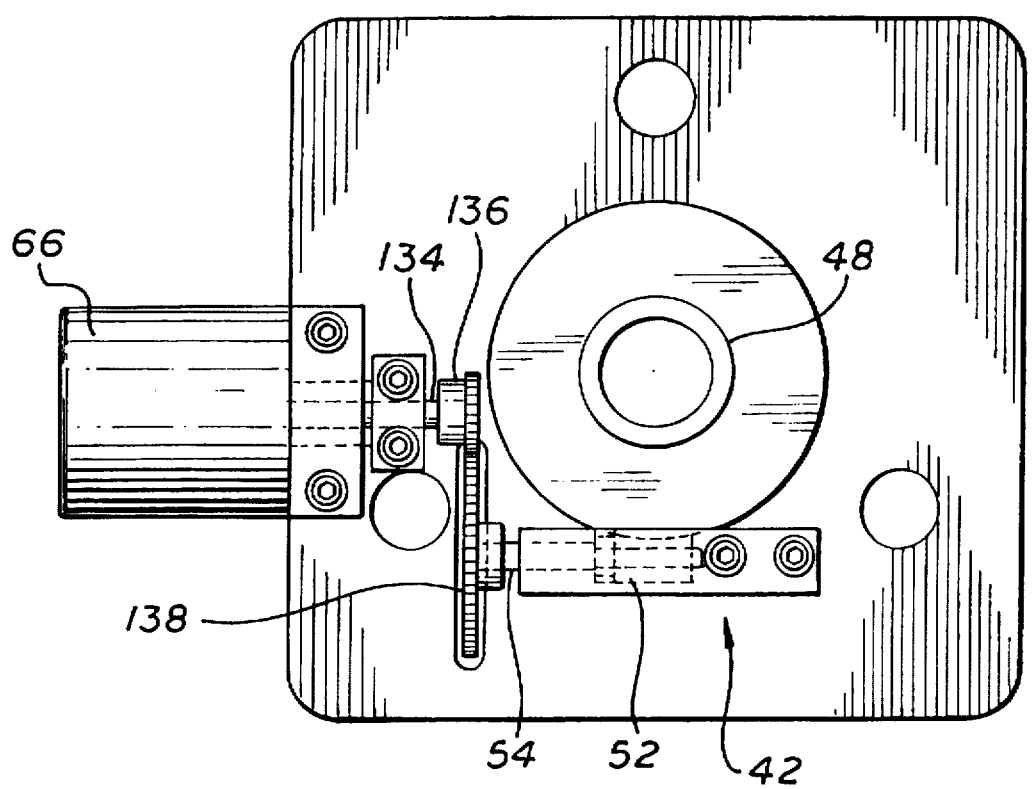
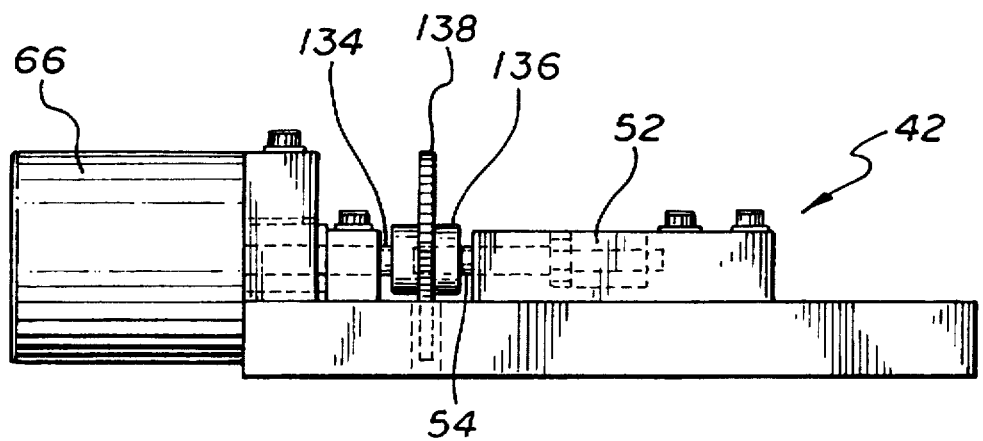
FIG. 4

AUTO-ADJUST APPARATUS FOR A VIBRATION ISOLATION SYSTEM

BACKGROUND OF THE INVENTION

1. Field of the Invention

This invention relates generally to suspension systems and methods for isolating and reducing the transmission of vibratory motion between an object and a base and, more particularly, to a compact omnidirectional isolation or suspension system that exhibits low stiffness, high damping to limit resonant responses of the system, effective isolation at higher frequencies, high isolator resonant frequencies, and can accommodate changing weight loads without significantly degrading isolation system performance. The present invention relates more specifically to an apparatus for automatically adjusting such an isolator to help accommodate varying weight loads and other effects which can cause the isolator to go out of adjustment, such as variations caused by changes in ambient temperature and creep of the isolator's main support spring.

2. Description of Related Art

The problems caused by unwanted vibration on equipment, devices and processes that are extremely motion sensitive have been widely researched and numerous solutions to prevent or reduce the transmission of vibration motion have been proposed and developed. Many of the devices designed to reduce the transmission of unwanted vibration between an object and its surroundings, commonly called vibration isolators or suspension devices, have utilized various combinations of elements including resilient pads made from a variety of materials, various types of mechanical springs, and pneumatic devices. There are, however, shortcomings and disadvantages associated with these particular prior art isolation systems which prevent them from obtaining low system natural frequencies and from limiting resonant responses to low values while providing high isolation performance at higher frequencies.

These shortcomings and disadvantages of prior art systems were addressed through the development of novel vibration isolation systems devices, and methods for retrofitting existing vibrating systems, described in U.S. Pat. No. 5,530,157, entitled "Vibration Isolation System" issued May 10, 1994, U.S. Pat. No. 5,370,352, entitled "Damped Vibration System" issued Dec. 6, 1994, U.S. Pat. No. 5,178,357, entitled "Vibration Isolation System" issued Jan. 12, 1993, U.S. Pat. No. 5,549,270, entitled "Vibration Isolation System" issued Aug. 27, 1996, and our co-pending application, Ser. No. 08/434,979, entitled "Vibration Isolation System" filed May 4, 1995, which are all hereby incorporated by reference in this present application.

The particular vibration isolation systems described in the above-identified patents and co-pending application, and utilized in connection with the present invention, provide versatile vibration isolation by exhibiting low stiffness in an axial direction (generally the direction of the payload weight) and any direction substantially transverse to the axial direction (generally a horizontal direction). This vibration isolation system may include a tilt-motion isolator for providing isolation in all six degrees of freedom, three translations and three rotations. The particular systems utilize a combination of unidirectional or bidirectional isolation subassemblies that can be connected together in series fashion to provide omnidirectional isolation. Each isolator is designed to isolate either the axial or the transverse component of any vibratory translation to effectively isolate vibrations along, or about, any directional axes. In subsequent discussions, an axial-motion isolator may also be referred to as a vertical-motion isolator, and the system of axial-motion isolators may also be referred to as a vertical-motion isolation system. Similarly, a transverse motion isolator may be referred to as a horizontal-motion isolator, and the system of transverse-motion isolators may be referred to as a horizontal-motion isolation system. Lastly, a tilt-motion isolator which comprises a mechanism which allows rotations about the tilt axes (tilt and roll) may be referred to as a tilt-motion isolation system.

In the embodiments described in the above-noted patents and co-pending application, the isolator system relies on a particular principle of loading an elastic structure which forms the isolator or a portion of it (the loading being applied by either the supported weight or by an external loading mechanism) to approach the point of elastic instability of the elastic structure. This loading of the structure to approach this point of elastic instability, also referred to as the "critical buckling load" of the structure, causes a substantial reduction of either the vertical or horizontal stiffness of the composite isolator to create an isolation system that has low stiffness in the vertical direction and in any horizontal direction, and increases the damping inherent in the structure. While stiffness is greatly reduced, the isolator still retains the ability to support the payload weight.

In the event that the load on the elastic structure is greater than the critical buckling load, the excessive load will tend to propel the structure into its buckled shape, creating a "negative-stiffness" or "negative-spring-rate" mechanism. By combining a negative-stiffness mechanism with a support spring, adjusted so that the negative stiffness cancels or nearly cancels the positive stiffness of the spring, one obtains a device that can be placed at or near its point of elastic instability. The magnitude of the load causing the negative stiffness can be adjusted, creating an isolator that can be "fine tuned" to the particular stiffness desired.

These above-described isolators provide excellent systems for isolating or reducing the transmission of vibratory motion between an object and the base by exhibiting low stiffness, high damping to limit resonant responses of the system, effective isolation at high frequencies and higher isolator resonant frequencies, while being capable of accommodating changing weight loads without significantly degrading isolation system performance. However, these isolators may require manual adjustments, from time to time, following small changes in the weight load on the vertical-motion isolator, or dimensional changes to the structure of the isolator caused by creep of the main support spring or variations in ambient temperature. Therefore, an automatic adjustment apparatus which can continuously and automatically adjust the vertical-motion isolator of such an isolation system in response to such variations would further enhance the already high performance of such vibration isolation systems. The present invention provides an apparatus for fulfilling all of these needs.

SUMMARY OF THE INVENTION

The present invention provides a novel apparatus for automatically adjusting an axial-motion isolator in response to variations in payload weight and dimensional changes, caused, for example, by creep of the main support spring or variations in ambient temperature. Previous embodiments of the vibration isolation systems have required manual adjustment of the isolator following even small changes in the weight load on the axial isolator, or dimensional changes due to creep of the main support spring or variations in ambient temperature. This automatic adjustment apparatus virtually eliminates, or greatly reduces, the need for manual adjustment of the isolator and permits the vibration isolation system to be used in automated applications where manual adjustments are normally impractical, for example, automatic inspection of semi-conductor wafers using atomic force microscopes or other metrology instruments.

Generally, this automatic adjustment feature of the present invention applies to an axial-motion isolator in a vibration isolation system comprising one or more isolators where the axial load on the isolator can vary due to varying acceleration loads. One example is an isolation system used to quiet noisy equipment in a submarine which is subjected to maneuver loads. Another example is an isolation system in a microgravity environment, such as a spacecraft, which can be used for isolating sensitive equipment from vibrations of the spacecraft structure which may be subject to varying acceleration from orbital maneuvers. Although the subsequent discussion addresses a vertical-motion isolator in a one-g environment where the axial direction is vertical, the present invention also applies to the more general axial motion isolator in a changing acceleration environment.

In order to achieve optimum performance, the vertical-motion isolator should be positioned at, or near, the center of its motion, also referred to as the "null" position or "optimum equilibrium" position. Previous vertical-motion isolators have provided a means for adjusting the isolator to achieve this optimum equilibrium position by changing the position of the lower spring support of the main spring which supports the payload. Since the weight on the main spring can be quite large, an apparatus such as a worm gear assembly has been used to make this adjustment manually.

In one preferred embodiment of the present invention, a small secondary control spring is positioned in parallel with the main support spring and is precompressed so that its compression increases the load on the main spring by a small amount. An increase in the compression of this secondary spring will cause an increase in the load on the main support spring. Similarly, a decrease in the compression on this secondary spring will cause a decrease in the load on the main support spring. The negative stiffness mechanism used in conjunction with the vertical-motion isolator can be easily adjusted to compensate for the increased stiffness on the vertical-motion isolator due to this small spring. A sensor is used to sense the vertical position of the isolator and provide a signal to an actuator which changes the compression of the secondary spring in order to keep the vertical position of the isolator at, or near, its optimum equilibrium position. Since the stiffness of this secondary spring is relatively small, adjustments in the spring compression are usually easy to make, even with the use of a small gearhead motor.

The vertical motion of the vertical-motion isolator is characterized by movement of a plate at the lower end of three columns that are used in the horizontal-motion isolator. When the isolator is displaced, a sensor attached to this plate signals the auto adjust apparatus to begin compressing or decompressing the secondary spring to restore the vertical-motion isolator to its optimum equilibrium position. Since the system has low stiffness and a low natural frequency, a change in the load can cause the vertical isolator to move to its stop limits either in the up or down direction. As is described in the previously identified patents and co-pending application, stops with relatively high load capacity are built into the isolator to limit the composite isolator's vertical and horizontal deflections, protecting the more sensitive elements, namely the flexures and columns, from overload. To minimize the time required to restore the system to its optimum equilibrium position, a higher speed adjustment is desirable when the isolator reaches either the up or down stop limits. However, the low frequency behavior of the vertical-motion isolator can result in unstable operation if the motion of the secondary spring is too rapid when the isolator is floated off its stops. Increased damping or use of a more sophisticated control algorithm than a simple on/off system could be used to increase the allowable speed. Such features as variable, eddy current damping, and/or variable speed control which is proportional to position could also be incorporated. However, in a preferred embodiment described herein, a two speed control is used which only requires structural damping which is inherent in the vertical-motion isolator. Vertical motion can be detected by a variety of devices, including but not limited to, optical switches, linear variable transducers, and proximity sensors.

The sensors which detect variable position can be used in conjunction with control algorithms to give continuously variable speed to avoid the problems of instability. The optical switch lends itself readily to the two speed control described herein. Actually, two sets of switches can be used, one set to detect motion below the optimum equilibrium position and the other to detect motion above.

In the event that the vertical-motion isolator moves down as a result of an increase in the weight load, the present invention operates as follows. Generally, the optical switch has a photo emitter and a photo/detector opposite each other, separated by a small gap. If an opaque piece of material (a shutter) is placed in the gap, the detector will not be activated, even though the emitter is still emitting IR radiation. If the shutter is moved exposing the emitter, the detector will detect the IR signal and conduct electricity, acting as a switch. Motion of the vertical-motion isolator is sensed by the optical switches when a shutter mounted on it moves within the gap of the switches. Very small movement is sensed by one of the "down" switches, sometimes referred to as the "dead band switch" when the shutter uncovers the emitter, causing the detector to conduct electricity. This switching begins a sequence of events arranged to start the decompression of the secondary spring which will compensate for the added load on the main support spring to move the isolator back to its optimum equilibrium position. Since the motion is generally quite small, the adjustment is made at a low-speed to avoid instability at the optimum equilibrium position. If, however, the motion is large (i.e., at or near the down limit), the other "down" switch referred to as a "high speed" switch, is uncovered by the large movement of the shutter, causing the adjustment to be conducted at a higher rate of speed. When the decompression of the secondary spring is large enough to cause the shutter to move up and re-cover the high speed switch, the adjustment returns to a slower speed. When the system is restored to the lower side of the dead band switch, the shutter re-covers the dead band switch and the adjustment terminates. The process for compensating for a decrease in the weight load or the main support spring is accomplished using the same shutter and similar optical switches.

The force required to compress or decompress the secondary spring is relatively small so a variety of devices could be used to accomplish the same task. Since the spring rate of the secondary spring is relatively low, the deflections required may be relatively large. Linear actuator motors, stepper motors or motors with lead screws can be used to effect a force on the secondary spring to produce the desired deflection. In one of the preferred embodiments described herein, a small gearhead motor may be used to drive a lead screw. A fitting which moves along the lead screw as it turns, either releases or applies compression to the secondary spring, as much as may be required.

If the change in the load on the vertical-motion isolator is relatively large, it is possible that the adjustment may exceed the range in which the auto adjust apparatus can operate. An additional set of switches may be installed to limit the motion so that the auto adjust apparatus does not drive the isolator to its mechanical stops. The switches are activated by a rod connected to the moveable fitting as it moves along the lead screw. If too much weight is removed from the vertical-motion isolator, the system will try to compensate and the fitting will compress the secondary spring until the rod actuates the lower limit switch, shutting of f the motor. If too much weight is added, the fitting will release compression until the upper limit switch is actuated, again shutting of f the motor. In either event, manual adjustments to the main support spring may be required to bring the auto adjust apparatus back within its operating range, so that it may once again operate normally.

In another embodiment of the present invention, the automatic adjustment of the vertical-motion isolator can be accomplished by providing a sufficiently large motor which can be connected to the worm gear assembly of the isolator utilizing a control system, similar to the one described above, to detect movement of the vertical-motion isolator from its optimum equilibrium position. The control system could then control the motor driving the worm gear assembly, causing the lower end of the support spring to be raised or lowered as may be appropriate, to attain the optimum equilibrium position.

All in all, the present invention provides a novel apparatus for automatically adjusting an axial (vertical)-motion isolator in a compact and relatively simple arrangement that can be easily installed on the isolator. This apparatus allows the isolator to be automatically adjusted following changes in the weight load on the isolator, including changes caused by creep of the main support spring or variations caused by changes in the ambient temperature. Other features and advantages of the present invention will become apparent from the following detailed descriptions, when taken in conjunction with the accompanying drawings which illustrate, by way of example, the principles of the present invention.

BRIEF DESCRIPTION OF THE DRAWINGS

FIG. 3 is a partial cross-sectional plan view, taken above the worm gear assembly, of another embodiment of the present invention showing a controller connected to the worm gear assembly which controls the compression of the main support spring of a vibration isolation system, such as the one shown in FIG. 1

FIG. 4 is a partial elevational view of the embodiment of the present invention as connected to the assembly shown in FIG. 3.

DETAILED DESCRIPTION OF THE PREFERRED EMBODIMENTS

Figure 1:
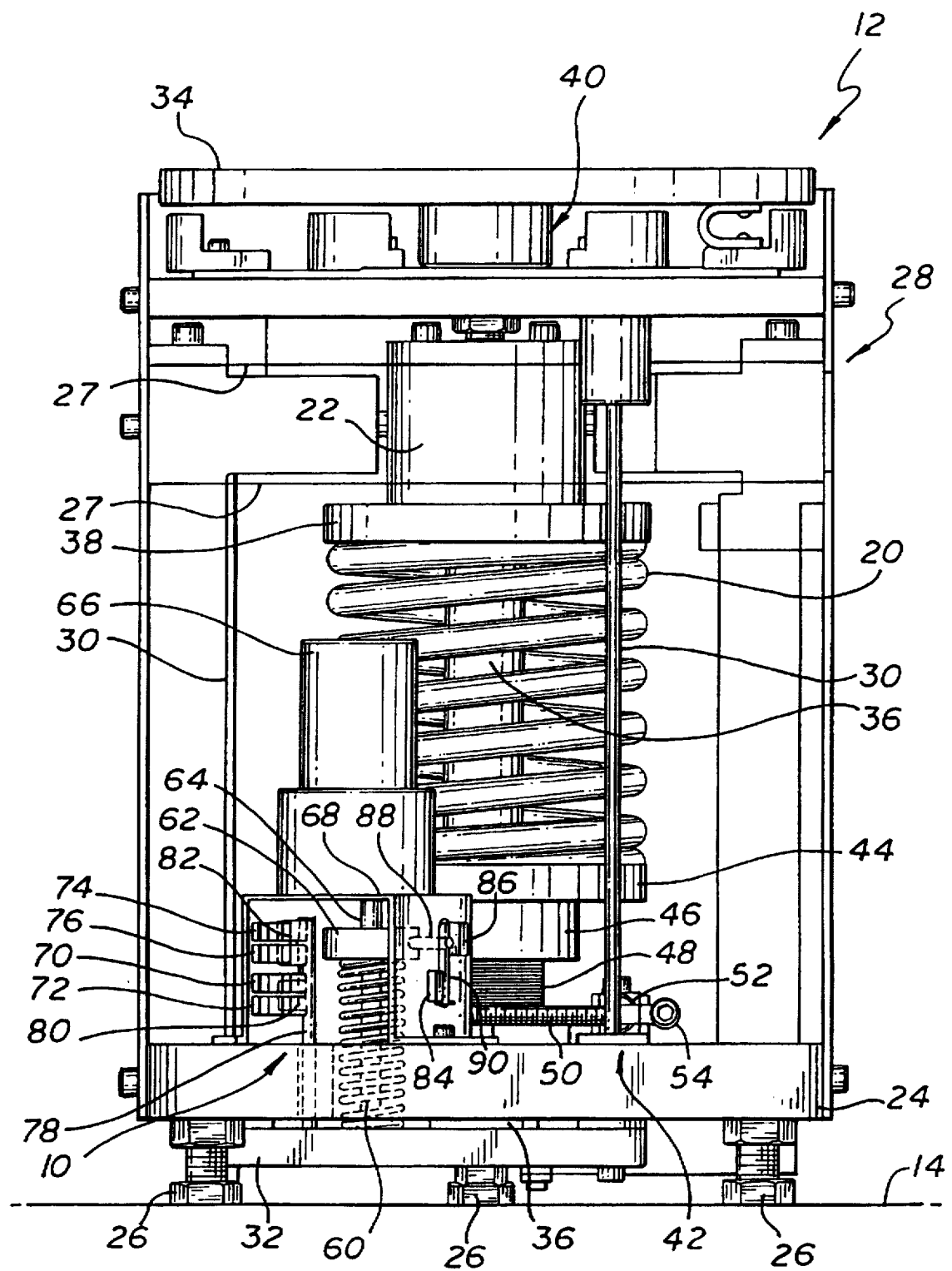
FIG. 1 is an elevational view of a vibration isolation system, with front cover removed, showing a particular embodiment of an auto adjust apparatus which incorporates features of the present invention.

The following is a detailed description of the present invention. FIG. 1 generally illustrates one particular form of an auto-adjust apparatus 10 for adjusting a vibration isolator 12 in response to variations in the weight load on the isolator and dimensional changes, due, for example, to creep of the main support spring or variations in ambient temperature. FIG. 1 shows one particular embodiment of an isolator 12 to which the auto-adjust apparatus 10 is attached. The isolator 12 is part of a vibration isolation system which supports a payload relative to a foundation 14 to reduce the transmission of omnidirectional vibrations between the payload and foundation 14.

The isolator 12 shown in FIG. 1 is very similar to the isolator described in our co-pending application Ser. No. 08/434,979, the isolator 12 comprising a vertical-motion isolator operatively connected vertically in series with a horizontalmotion isolator which is operatively connected vertically in series with a tilt-motion isolator. The vertical-motion, horizontal-motion and tilt-motion isolators are generally arranged in the same configuration as that shown in our copending application. Therefore, only general reference will be made to the particular elements making up the vertical-motion, horizontal-motion and tilt-motion isolators, since the particular operation of these individual isolators which form the isolator 12 can be found in the above-identified co-pending application.

The vertical-motion isolator of the present invention includes a support spring 20 in the form of a coil spring that operatively connects between a center hub assembly 22 and a base plate 24 that is connected to the foundation 18 by three leveling screws 26. A negative-stiffness mechanism 28 is also connected to the center hub assembly 22 to cancel stiffness from the support spring 20. This negative-stiffness mechanism includes radially compressed flexures 27 which are utilized to provide the negative-stiffness to the center hub assembly 22. The isolator also may include an anti-rotation device which is also described in greater detail in our above-referenced co-pending application.

The horizontal-motion isolator is comprised of three flexible beam columns 30 (only two of which are shown in FIG. 1) in the form of thin cylindrical rods that are operatively connected between a lower column plate 32 and an upper column plate (not shown). The beam columns 30 are press fitted into end fittings (not shown) which are attached to the upper column plate and to the lower column plate 32 utilizing screws or other fastening devices. The lower column plate 32 is connected to a stiff support shaft 36 which is in turn connected to an upper spring support 38 which forms part of the center hub assembly 22. This particular stiff support shaft 36 provides a relatively rigid connection between the top of the vertical-motion isolator and the bottom of the horizontal-motion isolator. The upper column plate which forms the top of the horizontal-motion isolator is connected to a top mounting plate 34 through a tilt flexure assembly 40 which acts as a tilt-motion isolator. Again, the specific detailed construction of the tilt-motion isolator is described in greater detail in our co-pending application Ser. No. 08/434,979.

The anti-rotation device prevents torsional deformation of the main support spring 20 as the lower spring support 44 is raised and lowered to accommodate changes in weight load on the isolator. The anti-rotation device includes a plate 46 that is clamped to the lower spring support 44. The plate 46 has a threaded hole that engages a threaded support tube 48 that is supported on a thrust bearing (not shown) that is contained in a recess in the base plate. A worm gear assembly 42 is provided which includes a worm gear 50 attached to the support tube 48 which engages a worm 52 that is mounted on the adjusting screw shaft 54 found in a housing that is attached to the base plate 24. The worm 52 is secured to the adjusting screw shaft 54 with a pin or similar fastener. The rotation of the screw shaft 54 raises or lowers the lower spring support 44 to accommodate changes in weight load on the isolator.

Referring still to FIG. 1, one particular form of an auto adjust apparatus 10 embodying features of the present invention is shown as it is attached to the isolator 12. A relatively small secondary control spring 60 is positioned in parallel with the main, load carrying, support spring 20. This secondary spring 60 is compressed between a fitting 62 that rides up on a threaded shaft 64 and the lower column plate 32. The compressed secondary spring 60 adds an additional force on the main support spring 20.

To vary the vertical position of the isolator, the compression on the secondary spring 60 can be changed, precluding the necessity to change the position of the lower spring support 44 of the main support spring 20. The adjustment may be made manually with another worm gear, similar to, but smaller than, the worm gear 50 used in conjunction with the main support spring 20. In this particular embodiment of the present invention, adjustments may be made using a small gearhead motor 66 which drives the threaded shaft 64 to change the compression on the secondary spring 60. This gearhead motor 66 is mounted to a bracket 68 which is mounted to the base plate 24. It should be appreciated that the secondary spring 60 extends through a recess formed in the base plate 24 for attachment to the lower column plate 32. Since the lower end of the secondary spring 60 rests on the lower column plate 32, a change in the compression of secondary spring 60 changes the force on the main support spring 20, the top of which is connected to the lower column plate 24 via the support shaft 36. An increase in the compression of the secondary spring 60 increases the force on the main support spring 20, moving the lower column plate 32 in a downward direction. A decrease in the compression of the secondary spring 60 decreases the force on the main support spring 20, causing the lower column plate 32 to move in an upward direction. Sensors may be used to detect the vertical position of the isolator 12 and drive the motor 66 to increase or decrease the compression of the secondary spring 60, to return the isolator to its optimum equilibrium position.

Again referring to FIG. 1, the sensor means for showing a deviation in the equilibrium position of the isolation from its optimum equilibrium position is shown as a plurality of electro-optical switches 70–76 which are utilized to sense the vertical position of the isolator by operating in conjunction with a shutter 78 which is attached to the lower column plate 32. This shutter 78 also extends through a recess formed in the base plate 24. As the lower column plate 32 moves up or down, the shutter 78 attached to it moves up and down within gaps in the electro-optical switches 70–76. The shutter has two areas of action, a narrow portion 80 and a wide portion 82. Both of these portions 80 and 82 are integral with the shutter 78. The electro-optical switches are adjustable in vertical position.

In operation, the narrow portion 80 of the shutter 78 passes through the gap formed in the electro-optical switches. Each electro-optical switch includes a photo emitter and photo diode (not shown in detail in FIG. 1), separated by a gap in which the shutter is located. The shutter moves up or down within this gap as the lower column plate 32 moves up or down so that when the shutter is moved sufficiently, the diode can "see" its emitter and then the diode conducts and energizes a core of a relay which in turn switches on the motor 66. This narrow portion 80 of the shutter 78 has associated with it a low-speed down switch 70 and a low-speed up switch 72. The wide portion 82 of the shutter 78 has a high-speed down switch 74 and a high-speed up switch 76 associated with it.

If the vertical position of the isolator has moved too low, the narrow portion 80 of the shutter 78 has moved downward with the low-speed down switch 70 being uncovered, starting the motor 66 turning in a direction which will decrease the compression on the secondary spring 60. As a force exerted by the secondary spring 60 on the main support spring 20 decreases, the lower column plate 32 moves up and the narrow portion 80 of shutter 78 re-covers the low-speed down switch 70, resulting in the stoppage of the motor 66. As a result, the isolator returns to its optimum equilibrium position. If the vertical position of the isolator is too high, caused by a possible decrease in the weight load on the isolator, the narrow portion 80 of shutter 78 has moved upward causing its low-speed up switch 72 to be uncovered. This in turn starts the motor 66 turning in a direction which will increase the compression on the secondary spring 60. As the force exerted by the secondary spring 60 on the main support spring 20 increases, the lower column plate 32 will be moved in a downward fashion. The narrow portion 80 of shutter 78 then re-covers its low-speed up switch 72 causing the motor 66 to be stopped. Again, the isolator is returned to its optimum equilibrium position.

There is a small range in the vertical position of the isolator over which the auto adjust apparatus does not operate, commonly referred to as the "dead band" in control system parlance. However, the dead band can be adjusted either by varying the vertical spacing between the low-speed up switch 72 and the low-speed down switch 70 or by varying the width of the narrow portion 80 of the shutter 78. By properly selecting the range of the dead band, the auto adjust apparatus should not interfere with the normal behavior of the isolator in attenuating vertical disturbances.

As described in our co-pending application, stops with relatively high load capacity are built into the isolator to limit the vertical and horizontal deflections, protecting the more sensitive elements, namely the flexures 27 and columns 30, from overload. In the event that the load on the isolator 12 is changed sufficiently to cause the isolator to move either to its upper or lower stop limits, the auto adjust apparatus 10 provides for rapid adjustment through the use of the wide portion 82 of the shutter 78 and its associated high-speed switches 74 and 76. If the load is increased and the lower column plate 32 moves down to its lower stop limit, the wide portion 82 of the shutter 78 uncovers its high-speed down switch 74, initiating the motor 66 in a direction which will decrease the compression on the secondary spring 60, thus reducing the load on the main support spring 20. In this instance, the motor 66 would be running at a higher speed in order to quickly restore the isolator to its optimum vertical position. Depending upon the amount of load which has been placed on the isolator, the motor 66 will continue to run for some time until the vertical position of the lower column plate 32 is moved again to its initial position. When the lower column plate 32 moves upward (i.e., off its lower stop limit), the wide portion 82 of the shutter 78 will re-cover its high-speed down switch 74 and the motor 66 will change speed. Note that the motor 66 should not stop since the narrow portion 80 of the shutter 78 has not yet re-covered its low-speed down switch 70, allowing the motor 66 to run at its reduced speed. The speed change is necessary to provide for rapid adjustment from the stop limit position to the dead band position without causing the system to go unstable.

If the load on the isolator is decreased and the lower column plate 32 moves to its upper stop limit of the isolator, then the wide portion 82 of the shutter 78 uncovers its high-speed up switch 76, starting the motor 66 in a direction which will increase the compression on the secondary spring 60, thus increasing the load on the main support spring 20. Again, the motor 66 will be running at a higher speed in order to quickly restore the isolator to its optimum equilibrium position depending on how much load has been placed on the isolator. The motor 66 should run for some time before the vertical position of the lower column plate 32 is again moved to its initial position. When the lower column plate 32 moves downward, off its upper stop limit, the wide portion 82 of the shutter 78 will re-cover its high-speed up switch 76 and the motor 66 should again change speed. The motor should continue running at a lower speed since the narrow portion 80 of the shutter has also uncovered low-speed up switch 72, which will allow the motor to continue to run at a lower speed until the narrow portion 80 of the shutter re-covers its switch 72.

It should be appreciated that the vertical motion of the isolator is only indirectly influenced by the compression of this secondary spring 60. It is possible that the load on the isolator may be too large, in which the changing of the compression on the secondary spring will not move the isolator off its upper or lower stop limits. In that event, the auto adjust apparatus, itself, would reach its mechanical limits. To protect against the device from being driven to its mechanical limits, a pair of limit switches 84 and 86 are also provided. These mechanical limit switches 84 and 86 are actuated by a rod 88 which is connected to the fitting 62 which is driven by the threaded shaft 64. This rod 88 extends through one side of the mounting bracket 68 such that it can actuate the limit switches 84 and 86, one switch acting as a lower limit switch 84 and the other acting as an upper limit switch 86. The rod 88 also prevents rotation of the upper end of the secondary spring as the rod 88 moves within a slot 90 formed within the bracket 68 when the secondary spring 60 is compressed (or decompressed) by the turning of the threaded shaft 64.

Figure 2:
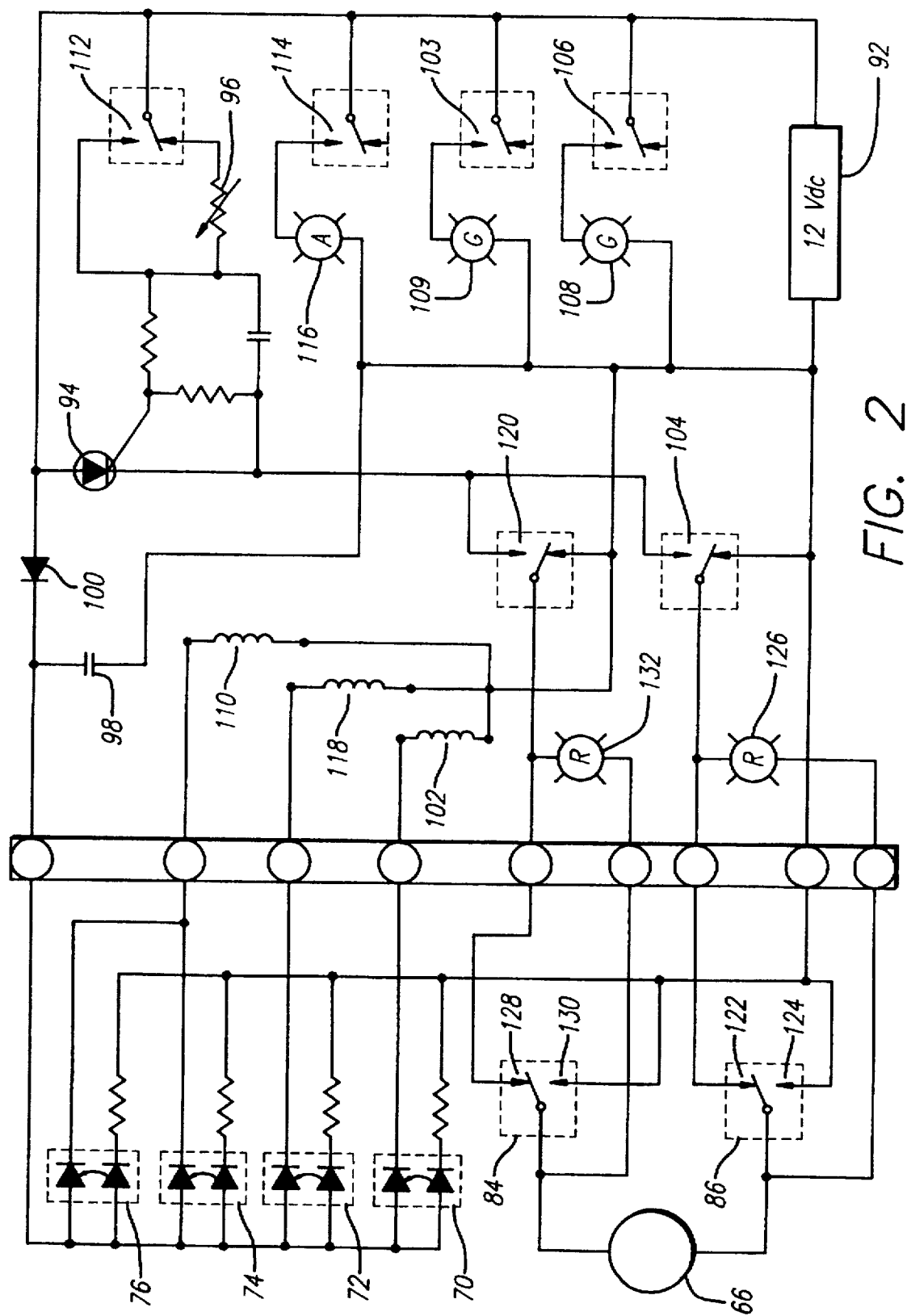
FIG. 2 is a schematic diagram of the controls for a particular embodiment of an auto adjust apparatus which embodies features of the present invention.

One embodiment of a control system for the auto-adjust apparatus is shown schematically in FIG. 2. In this particular embodiment of the control system, the auto-adjust apparatus is powered by a small 12 volt DC power source 92. The power can be switched off so the adjust apparatus can be deactivated as needed. A gearhead motor 66 is used, although other means for compressing the secondary spring could also be utilized without departing from the spirit and scope of the present invention. The voltage supplied to the motor is regulated by a silicon control rectifier (SCR) 94 to control the speed at which the motor runs. The output of the SCR 94 modulates the wave form of the full wave rectifier and the power supply in such a manner that sufficient torque is available from the motor over a wide range of speeds. The high speed of the motor is based on its placard value at 12 volts DC. The lower speed is set by a potentiometer 96. The DC for the electrical optical switches 70-76 is filtered by a capacitor 98 and a blocking diode 100.

Referring now both to FIGS. 1 and 2, as previously described above, the electro-optical switches 70-76 include a photo emitter and photo diode, separated by a gap in which the shutter is located. When the shutter is moved so that the diode can "see" the emitter, the diode conducts and energizes the coil of a relay which switches the motor on. When the low-speed down switch 70 is activated by the narrow portion 80 of the shutter 78 as it moves downward, a down relay 102 will be energized. A contact 104 of this relay 102 connects the motor 66 to the output of the SCR 94. Another contact 106 is provided such that as it is closed, it turns on a green indicator lamp 108 which shows that the auto adjust apparatus is reducing the compression on the secondary spring 60 (i.e., reducing the load on the main support spring), thus causing the lower column plate 32 to move upwardly. If the high-speed down switch 74 is activated by the wide portion 82 of the shutter 78 as it is moving downward (i.e., when the isolator moves to its lower stop limit), a high speed relay 110 is energized. A contact 112 on this particular relay 110 closes and the speed potentiometer 96 is bypassed, causing the motor 66 to operate at a higher rate of speed in the same direction. Another contact 114 closes, turning on an amber indicator light 116 to indicate that the auto adjust apparatus is operating in the high speed mode. When the high-speed down switch 74 is recovered by the wide portion 82 of the shutter 78, the high speed relay 110 is deenergized and its contacts 112 and 114 are opened. The amber indicator light 116 then goes out, but the motor 66 continues to run because the low-speed down switch 70 is still on. When the narrow portion 80 of the shutter 78 re-covers its low-speed down switch 70, its relay 102 is deenergized, causing the motor to stop and the green indicator light 108 to turn off. A similar sequence occurs when the narrow portion 80 of the shutter 78 moves up and the low-speed up switch 72 turns on an up relay 118. In this case, the motor 66 is connected to the output of the SCR 94 through a contact 120 so that the compression on the secondary spring is increased. If the vertical motion of the isolator causes the wide portion 82 of the shutter to turn on its high-speed up switch 76, then the high speed relay 110 is in turn energized, causing the motor to run at a higher speed, again turning on the amber indicator light 116 as well. When the narrow portion 80 and wide portion 82 of the shutter re-cover their particular switches, the auto-adjust apparatus shuts down as before.

When the load change on the isolator is too large and cannot be compensated for by changing the compression on the secondary spring, the motor in the auto adjust apparatus will continue to run (either up or down) until the rod 88 trips one of its mechanical limit switches 84 or 86. The upper limit switch 86 is actuated when the down switches 70 and 74 drive the motor to its stop limit in attempting to minimize the compression on the secondary spring. A contact 122 is then opened, removing power to the motor coming from its contact 104 from the down relay 102. An additional contact 124 closes, turning on a red indicator light 126 showing that the auto adjust apparatus is at its down limit, permitting power to be applied to the motor in the opposite direction through contact of the up relay 118. The lower limit switch 84 operates in a similar manner when the up switches 72 and 76 drive the motor to its stop limit in maximizing the compression on the secondary spring. Lower limit switch 84 includes contacts 128 and 130 which operate similarly to open or close the switch. In this case, a red indicator light 132 is turned on showing that the auto-adjust apparatus is at its lower stop limit.

FIGS. 3 and 4 show another embodiment of an auto adjust apparatus which embodies certain features of the present invention. In this particular embodiment, the structure of the vertical-motion and horizontal-motion isolators are not shown, but rather the worm gear assembly 42 that was previously used to raise or lower the lower spring support 44 of the main support spring 20 is shown. Such a worm gear assembly 42 was shown and described in greater detail in our co-pending application, Ser. No. 08/434,979. In FIGS. 3 and 4, an output shaft 134 of the gearhead motor 66 is connected to a small gear 136 which engages a larger gear 138 that is connected to the shaft 54 of the worm gear assembly 42. Similar sensors and control logic as described in the previous embodiment of FIGS. 1 and 3 could also be used with this present embodiment, except, instead of the motor 66 changing the compression on the secondary spring, the motor 66 now drives the worm gear assembly 42 itself, raising and lowering the lower spring support 44 to restore the isolator to its optimum equilibrium position.

Although simple on/off optical sensors and a two speed control system have been utilized in the present embodiments described herein, it should be appreciated to those skilled in the art that other sensors could be used to sense the displacements of the isolator, for example, linear variable transducers and proximity sensors, and more sophisticated control algorithms could be used for continuously varying the speed control to minimize the problems of instability. Similarly, increased damping, including variable damping such as eddy current damping, could be used to avoid instabilities and help optimize the behavior and reduce restoration time.

The elements making up the present structures can be made from common structural materials such as steel and aluminum alloys. The sensors, relays and other components of the control system can be made from commonly available components. While particular forms of the invention have been illustrated and described, it would be apparent that various modifications can be made without departing from the spirit and scope of the present invention. Accordingly, it is not intended that the invention be limited, except by the attached claims.

What is claimed is:

1. An automatic adjustment apparatus for adjusting the optimum equilibrium position of an axial-motion isolator for supporting an object in an equilibrium position relative to a base which includes a support spring for providing stiffness and force supporting capability in an axial direction operatively connected to a negative-stiffness-producing apparatus for producing negative stiffness in the axial direction to allow the support spring and negative-producing-apparatus combine to produce low axial stiffness to suppress the transmission of vibratory motion between the object and base, the automatic adjusting apparatus comprising:

a control spring having first and second ends operatively connected in parallel with the support spring, wherein translation of said second end of said control spring relative to said first end changes the force carried by said support spring and the equilibrium position of the object relative to the base;

sensor means for sensing a deviation in the equilibrium position of the object relative to the base from the optimum equilibrium position of the object relative to the base and providing an electrical signal indicating such deviation; and control means for translating the second end of said control spring relative to said first end to correct the deviation of the equilibrium position of the object from the optimum equilibrium position.

2. The automatic adjustment apparatus as defined in claim 1 wherein the stiffness of said control spring is much less than the stiffness of the support spring.

3. The automatic adjustment apparatus as defined in claim 1 wherein said sensor means comprise at least one electro-optical switch.

4. The automatic adjustment apparatus as defined in claim 1 wherein said control means includes a motor for translating the second end of said control spring relative to said first end to change the compression of said control spring in response to a deviation in the equilibrium position.

5. The automatic adjustment apparatus as defined in claim 1 wherein said sensor means senses at least two different magnitudes of the deviation in the equilibrium position, and said control means translates the second end of said control spring relative to said first end at different speeds depending on the magnitude of the deviation of the equilibrium position.

6. The automatic adjustment apparatus as defined in claim 1 wherein said axial direction is vertical and the apparatus and isolator are supporting a weight load in a one-g environment.

7. An automatic adjustment apparatus for adjusting the optimum equilibrium position of an axial-motion isolator for supporting an object in an equilibrium position relative to a base which includes a support spring for providing stiffness and force supporting capability in an axial direction operatively connected to a negative-stiffness-producing apparatus for producing negative stiffness in the axial direction to allow the support spring and negativeproducing-apparatus combine to produce low axial stiffness to suppress the transmission of vibratory motion between the object and base, the automatic adjusting apparatus comprising:

sensor means for sensing a deviation in the equilibrium position of the object relative to the base from the optimum equilibrium position of the object relative to the base and providing an electrical signal indicating such deviation; and control means for translating one end of the support spring to correct the deviation of the equilibrium position of the object from the optimum equilibrium position, wherein said sensor means senses at least two different magnitudes of the deviation in the equilibrium position, and said control means translates the end of said support spring at different speeds depending on the magnitude of the deviation of the equilibrium position.

8. The automatic adjustment apparatus as defined in claim 7 wherein said axial direction is vertical and the isolator is supporting a weight load in a one-g environment.

9. The automatic adjustment apparatus as defined in claim 7 wherein said sensor means comprise at least one electro-optical switch.

10. The automatic adjustment apparatus as defined in claim 7 wherein said control means includes a motor for translating the end of the support spring in response to a deviation in the equilibrium position.

11. An axial-motion isolator having force-supporting capability in an axial direction for supporting an object in an equilibrium position relative to a base, for suppressing transmission of vibratory motion between the object and base, said isolator having axial stiffness and an optimum equilibrium position of the object relative to the base, comprising:

a support spring for providing positive stiffness and force supporting capability in the axial direction for supporting the object;

negative-stiffness-producing means for producing negative stiffness in the axial direction operatively connected to said support spring, said support spring and negative-stiffness-producing means combining to produce low axial stiffness; and an automatic adjusting apparatus including:
  a control spring having first and second ends operatively connected in parallel with the support spring, wherein translation of said second end of said control spring relative to said first end changes the force carried by said support spring and the equilibrium position of the object relative to the base:

sensor means for sensing a deviation in the equilibrium position of the object relative to the base from the optimum equilibrium position of the object relative to the base and providing an electrical signal indicating such deviation; and control means for translating the second end of said control spring relative to said first end to correct the deviation of the equilibrium position of the object from the optimum equilibrium position.

12. The axial-motion isolator as defined in claim 11 wherein said axial direction is vertical and the isolator is supporting a weight load in a one-g environment.

13. The axial-motion isolator as defined in claim 11 wherein the stiffness of said control spring is much less than the stiffness of the support spring.

14. The axial-motion isolator as defined in claim 11 wherein said sensor means comprise at least one electro-optical switch.

15. The axial-motion isolator as defined in claim 11 wherein said control means includes a motor for translating the second end of said control spring relative to said first end to change the compression of said control spring in response to a deviation in the equilibrium position.

16. The axial-motion isolator as defined in claim 12 wherein said sensor means senses at least two different magnitudes of the deviation in the equilibrium position, and said control means translates the second end of said control spring relative to said first end at different speeds depending on the magnitude of the deviation of the equilibrium position.

17. An axial-motion isolator having force-supporting capability in an axial direction for supporting an object in an equilibrium position relative to a base, for suppressing transmission of vibratory motion between the object and base, said isolator having axial stiffness and an optimum equilibrium position of the object relative to the base, comprising:

a support spring for providing positive stiffness and force supporting capability in the axial direction for supporting the object;

negative-stiffness-producing means for producing negative stiffness in the axial direction operatively connected to said support spring, said support spring and negative stiffness-producing means combining to produce low axial stiffness; and an automatic adjusting apparatus including:

sensor means for sensing a deviation in the equilibrium position of the object relative to the base from the optimum equilibrium position of the object relative to the base and providing an electrical signal indicating such deviation; and control means for translating one end of said support spring to correct the deviation of the equilibrium position of the object from the optimum equilibrium position.

18. The axial-motion isolator as defined in claim 17 wherein said axial direction is vertical and the isolator is supporting a weight load in.a one-g environment.

19. The axial-motion isolator as defined in claim 17 wherein said sensor means senses at least two different magnitudes of the deviation in the equilibrium position, and said control means translates the end of said support at different speeds depending on the magnitude of the deviation of the equilibrium position.

20. The axial-motion isolator as defined in claim 17 wherein said sensor means comprise at least one electro-optical switch.

21. The axial-motion isolator as defined in claim 17 wherein said control means includes a motor for translating one end of said support spring in response to a deviation in the equilibrium position.

* * * * *

UNITED STATES PATENT AND TRADEMARK OFFICE
CERTIFICATE OF CORRECTION

PATENT NO. : 5,794,909
DATED : Aug. 18, 1998
INVENTOR(S) : David L. Platus, Donald A. Durran It is certified that error appears in the above-identified patent and that said Letters Patent is hereby corrected as shown below:

Column 5, line 13, after "shutting", change "of f", to read --off--.

Column 13, claim 16, line 26, change "12", to read --11--.

Signed and Sealed this

First Day of December, 1998

*Attest:*

BRUCE LEHMAN

*Attesting Officer*    Commissioner of Patents and Trademarks